Dec. 10, 1968   R. G. MARCHISIO ET AL   3,415,157
ALIGNMENT CONTROL APPARATUS
Filed May 11, 1967   3 Sheets-Sheet 1

INVENTORS
ROBERT G. MARCHISIO
ROBERT HENNESSY
BY
David A. Rich
ATTORNEY

United States Patent Office 3,415,157
Patented Dec. 10, 1968

3,415,157
ALIGNMENT CONTROL APPARATUS
Robert G. Marchisio, North Andover, and Robert Hennessy, Concord, Mass., assignors to Itek Corporation, Lexington, Mass., a corporation of Delaware
Filed May 11, 1967, Ser. No. 637,727
14 Claims. (Cl. 89—41)

ABSTRACT OF THE DISCLOSURE

Gun alignment apparatus having a telescopic seeker gimbaled for two degrees of motion with respect to a vehicle and controlling the position of a gun with two degrees of freedom. Rate gyro means and circuits are coupled to the telescope to produce error signals indicative of displacement of the telescope optical axis from an inertial reference axis. The error signals are coupled to the deflection coils of an image intensifier tube to stabilize the target image in the presence of spurious motions. The error signals are also coupled to the gun to maintain the boresight aligned with respect to the inertial reference axis.

The present invention relates to apparatus for control of the alignment of an operating mechanism along an operating axis. More particularly, the invention relates to the alignment of operating mechanisms such as guns, cameras, missiles, etc., in an environment subjecting the operating mechanism to spurious motions.

In the prior art a gun for example, may have its boresight aligned with a desired target in accordance with the optical axis of a telescope used by the observer for observing a desired target with respect to an orthogonal set of axes intersecting at the optical axis in a reticle attached to the telescope. The gun is typically mounted on a tank, aircraft or ship which is subject to spurious motions relative to the line of sight tending to obscure the position of the target as viewed by the observer. In such systems the telescope is typically mounted on vertical and horizontal gimbals each of which have a pickoff providing an angular position signal indicative of the vertical and horizontal angles of the telescope with respect to the aircraft. The terms vertical and horizontal as used herein include, but are not limited to, a system of orthogonal intersecting axes relative to a pair of orthogonal reference axes. Ordinarily, the reference axes are provided by the earth. In many applications the reference axes are provided by an arbitrary inertial frame of reference. In the case of a rolling aircraft or spacecraft, the so-called vertical and horizontal axes may interchange.

The gun is mounted to the craft and similarly gimbaled with pickoffs to provide vertical and horizontal angular position signals relative to the craft. Vertical and horizontal alignment motors control the alignment of the boresight axis. In the simplest form, the vertical and horizontal alignment motors are simply slave motors taking their signals from the generators coupled to the telescope.

The operating mechanism may be any of a number of mechanisms which must be aligned with respect to an object along an operating axis. In place of a gun, e.g., one may use a television camera, a movie camera or a still camera.

When the operating mechanism is mounted on, for example, a mobile craft subject to spurious motions, the position of the operating mechanism relative to a remote object tends to be obscured. Similarly, the image as viewed by an observer through a telescope tends to be obscured and its position becomes uncertain. In the case of a fire control system for a gun, the observer frequently is forced to fire the gun even though its boresight is not accurately aligned with a desired target.

It is therefore an object of the invention to provide an improved alignment control apparatus which substantially reduces the effects of spurious motions of an operating mechanism.

A further object of the invention is to provide an improved alignment control apparatus enabling an observer to sight a desired object by viewing a relatively stabilized image.

Yet another object of the invention is to provide an improved alignment control apparatus for accurately aligning an operating mechanism along an operating axis to a desired object.

Other and further objects of the invention will be apparent from the following description, taken in connection with the accompanying drawings, and its scope will be pointed out in the appended claims.

In accordance with the invention, there is provided an alignment control apparatus. The apparatus includes receiving means having a receiving axis for receiving a signal from a source along a signal axis. Inertial means are coupled to the receiving means for providing an error signal indicative of displacement of the receiving means relative to an inertial reference, in response to motions of the receiving means. Deflection means are coupled to the receiving means and the inertial means for deflecting the received signal relative to the inertial reference, in response to the error signal, for cancelling out motions of the received signal relative to the inertial reference. Operating means are coupled to the receiving means for performing an operation with respect to the source along an operating axis. Alignment means are coupled to the operating means and the inertial means for aligning the operating means with respect to the inertial reference, in response to the error signal, tending thereby to cancel out motions of the operating means relative to the inertial reference.

In one form of the invention, base means are included, the receiving means and the operating means being coupled to the base means. The receiving means includes a telescope having an objective lens and an eyepiece. The receiving axis is the optical axis of the telescope. The telescope is gimbaled to enable two degrees of angular motion with respect to the base. An image intensifier tube is disposed within the telescope along the optical axis between the objective lens and the eyepiece with an input face at the focal point of the objective lens and an output face at the focal point of the eyepiece. In this manner an observer may view the image free from spurious motions relative to the inertial reference. Receiving angular position means are coupled to the base and the telescope for producing a vertical receiving angle signal indicative of the vertical angle between the optical axis and the base and a horizontal receiving angle signal indicative of the horizontal angle between the optical axis and a horizontal reference on the base. The operating means is gimbaled to enable two degrees of angular motion relative to the base. Operating angular position means are coupled to the operating means for producing a vertical angle signal indicative of the vertical angle between the operating axis and the base and a horizontal operating angle signal indicative of the horizontal angle between the operating angle and a horizontal reference on the base. The inertial means include vertical inertial means for producing a vertical error signal and a horizontal inertial means for producing a horizontal error signal relative to the inertial reference. The deflection means include a vertical magnetic coil surrounding the image tube to deflect the image vertically in response to the vertical error signal and a horizontal magnetic coil surrounding the image tube to deflect the image horizontally in respect to the horizontal error signal. Summing means are coupled to the inertial means and the receiving angular position means and include vertical summing means for algebraically summing the vertical error signal and the vertical receiving signal and horizontal summing means for algebraically summing the horizontal error signal and the horizontal receiving angle signal. Differential amplifier means are coupled to the summing means, the operating angular position means and the alignment means. The differential amplifier includes vertical differential amplifier means for producing a vertical differential control signal to align the operating means vertically in response to the vertical summed signals and the vertical operating angle signal. It also includes horizontal differential amplifier means for producing a horizontal differential control signal to align the operating means horizontally in response to the horizontal summed signal and the horizontal operating angle signal.

In a preferred embodiment the inertial means includes a rate gyroscope, a demodulator and an integrator.

Principles of operation

As noted above, in a typical fire control system the boresight axis of the gun is slaved to the optical axis of a sighting telescope. The observer sights a target and locates it at the intersection of orthogonal cross-hairs to center the target along the optical axis of the sight. The gun is correspondingly slaved so that the boresight is oriented parallel to the optical axis.

In accordance with the present invention an electronic image motion stabilization system is superimposed on the fire control system to align the boresight axis of the gun with respect to an inertial reference. The inertial reference is provided for example, by a rate gyroscope mounted for motion with the telescope.

The gyro produces a signal tending to maintain the target image stabilized in position as seen by an observer. To a first order approximation the boresight axis and the optical axis are slaved together. Spurious motions tending to disturb the orientation of the optical axis relative to the inertial reference are reflected to the boresight axis as well. The gyro signal tending to stabilize the target image position as seen by the observer is also applied to the operating means or gun similarly to correct the orientation of the boresight axis.

The response time of the image motion stabilization system is chosen to be relatively fast. Motion of the telescope due to the alignment by the observer of the telescope to acquire a target are relatively slow.

A second order problem relates to the misalignment of the optical axis and the boresight axis due to spurious motions. For example, the telescope may vibrate at frequencies different from the vibration frequencies of the gun. Consequently, the boresight axis and the optical axis are in conjunction only during a relatively few degrees of the vibration cycle. The gun is disabled except during the period that the boresight and optical axes are substantially in conjunction. During that period an enabling signal is produced which permits the trigger and the gun to operate. The gun thus fires only at such times as a hit is most probable.

In the drawings:

FIG. 3A is a front view of a screen illustrating target image position; and

Figure 1:
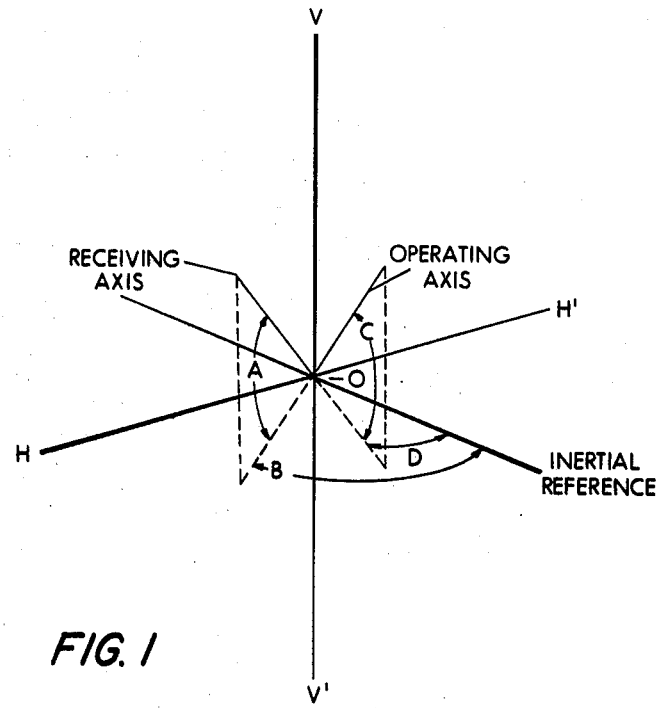
FIG. 1 is a graph illustrating axis position with respect to a spatial reference.
Figure 2:
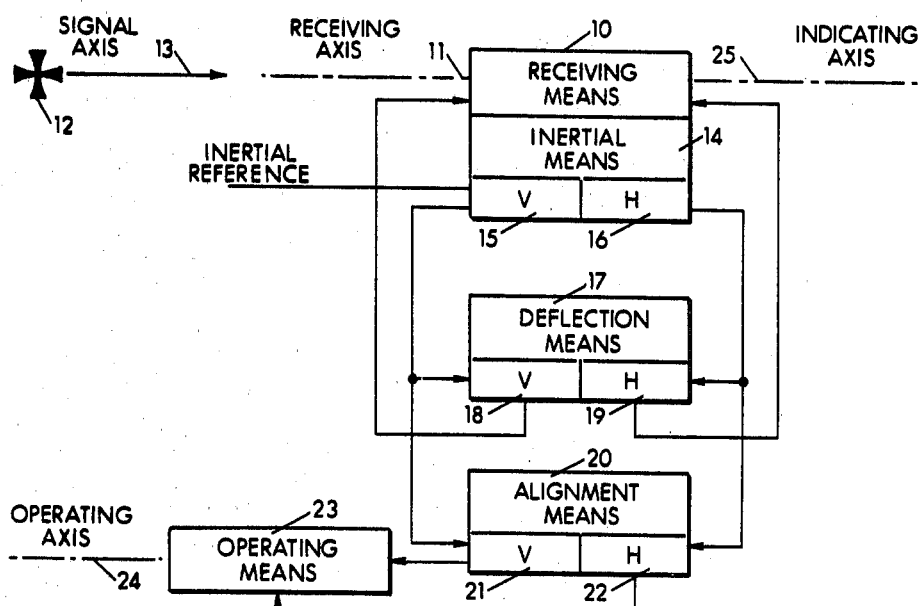
FIG. 2 is a block diagram of an alignment control apparatus embodying the invention.

Description and explanation of the apparatus in FIGS. 1 and 2

Referring now to the drawings and with particular reference to FIG. 2, there is illustrated an alignment control apparatus embodying the invention. The apparatus as shown is directed to alignment control in two degrees of freedom labeled V and H.

Thus a receiving means 10 receives a signal along a receiving axis 11 from a source 12 along a signal axis 13. An inertial means 14 is coupled to the receiving means for producing V and H error signals corresponding to orthogonal inertial reference axes to provide an inertial reference. The reference frame is illustrated in FIG. 1. The inertial means includes a V error signal means 15 and H error signal means 16. A deflection means 17 including a V deflection element 18 and H deflection element 19 is coupled to the receiving means and the inertial means as shown. The deflection means is also coupled to an alignment means 20 having a V alignment element 21 and an H alignment element 22. The alignment means 20 is coupled to an operating means 23 which performs an operation along an operating axis 24. An indication of the received signal with respect to an indicating axis 25 is provided by the receiving means 10.

In FIG. 1, the inertial reference is represented by the orthogonal axes HH' and VV'. A spatial reference line is thus provided at the intersection O of the reference axes perpendicular to the reference plane. The angle A indicates the V deflection of the receiving axis and the angle B indicates the H deflection of the receiving axis with respect to the inertial reference. The angle D indicates the V deflection of the operating axis and the angle C indicates the H deflection of the operating axis with respect to the inertial reference.

Operation

A signal radiated for example, from a source 12, along the signal axis 13 is received by the receiving means 10. When the receiving means is oriented with the receiving axis 11 coaxial with the signal axis 13, the indicating axis 25 is coaxial also. The inertial means 14 coupled to the receiving means provides an inertial reference. When a motion is applied to the receiving means 10 causing the receiving axis to be oriented for example, as shown in FIG. 1, an error signal is produced indicative of angle A in FIG. 1 by the V error signal means 15 of the inertial means 14. An error signal indicative of the angle B is produced by the H error signal means 16. The error signals are coupled to the corresponding V deflection element 18 and H deflection element 19, respectively. The deflection signals deflect the received signal relative to the inertial reference, tending to maintain it in a constant position with respect to the indicating axis, effectively to cancel out the moton of the receiving means.

Simultaneously, the error signals are coupled to the alignment means 20. The V element 21 and H element 22 realign the operating means 23 and the operating axis 24 for example, as shown in FIG. 1. The orientation of the operating axis 24 tends to remain constant with respect to the inertial reference.

Figure 3:
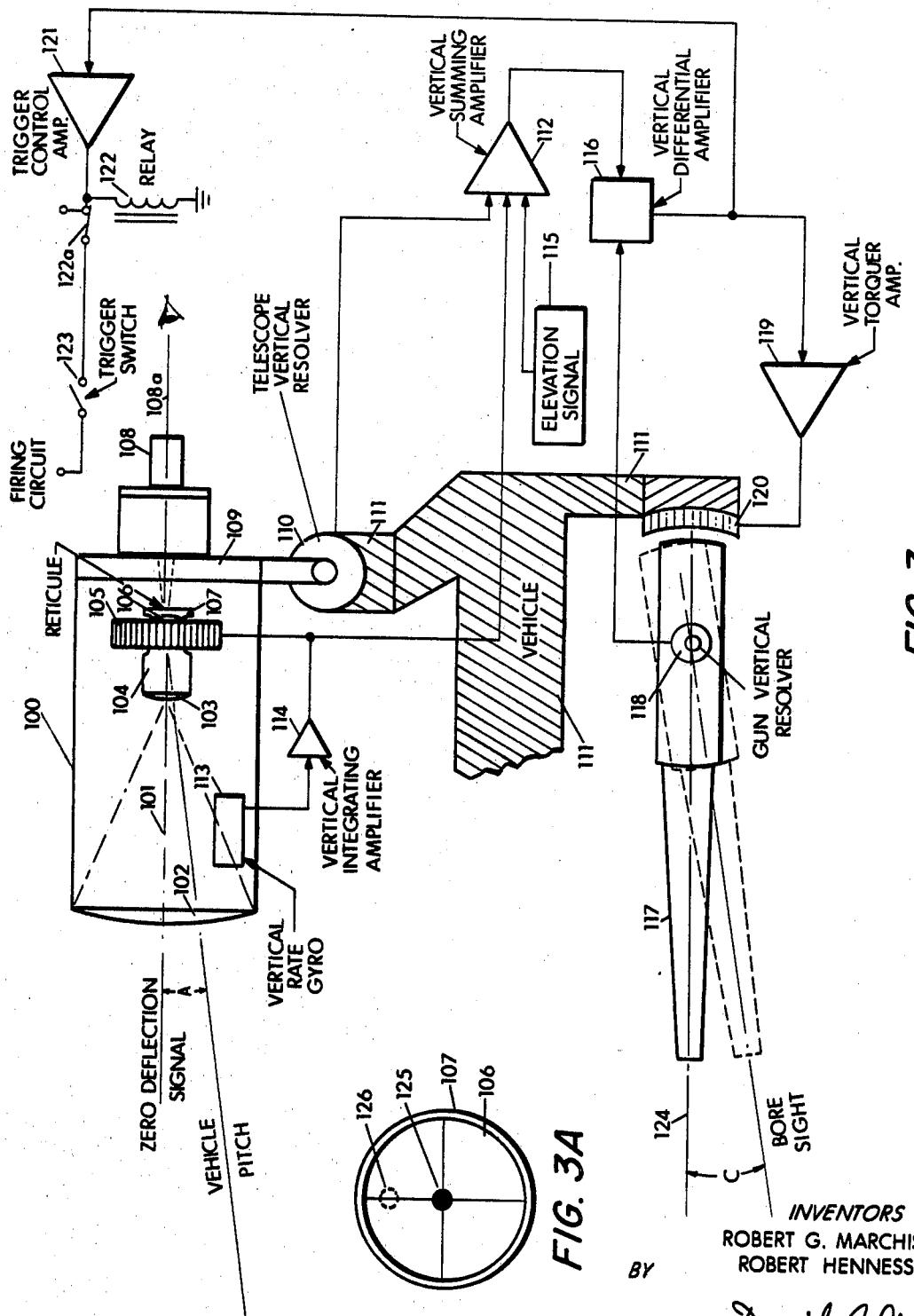
FIG. 3 is a diagram of an alignment control apparatus for a gun alignment system embodying the invention.
Figure 4:
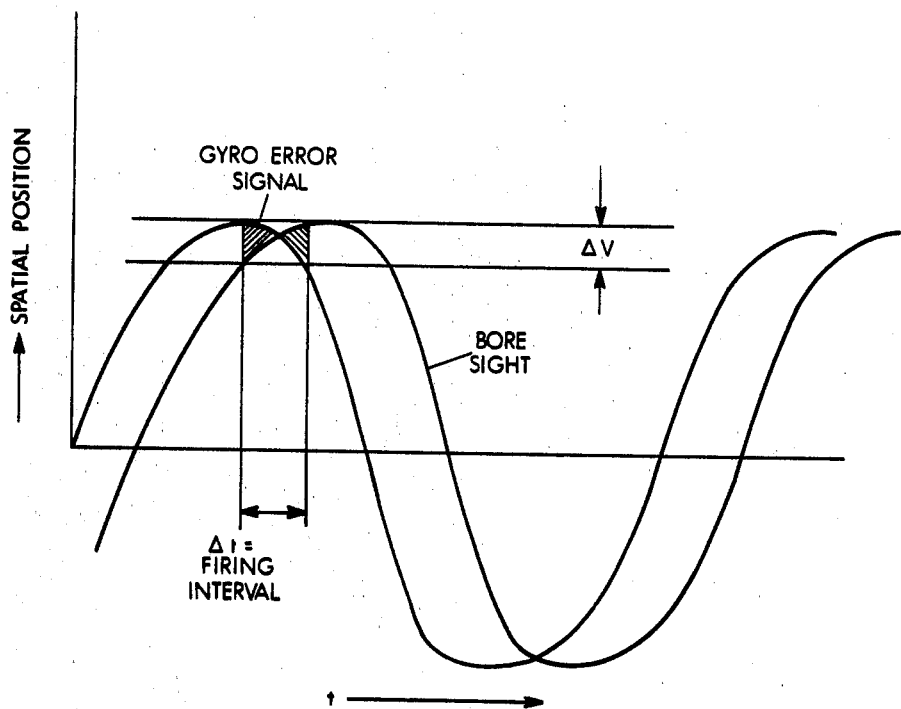
FIG. 4 is a graph illustrating the operation of the system in FIG. 3.

Description and explanation of the system in FIGS. 3 and 4

Referring now to FIG. 3, there is illustrated a gun alignment control system. The system as shown, illustrates vertical alignment only, for greater clarity. It will be apparent from the description of FIG. 2 that the horizontal alignment is obtained in a similar manner.

A telescope for acquiring a target is rotatably coupled to a vertical resolver mounted on a vehicle such as, an airplane, ship or tank. The resolver provides a signal indicative of the vertical orientation of the telescope with respect to the vehicle. The objective lens of the telescope is focused on the input face of an image intensifier tube.

The tube converts the optical image into an electron stream which impinges on the output face providing an intensified output optical image. A magnetic deflection coil surrounds the tube for deflecting the electron stream to position the output image with respect to a reticle. The eyepiece of the telescope focuses on the reticle to enable an observer to view the position of the target image on the output face of the tube. In a copending application entitled "Image Motion Stabilization System," Ser. No. 462,322, filed June 8, 1965, an image motion cancellation system is described and illustrated which is useful in the present invention.

A gun is coupled through a gun vertical resolver to the vehicle. A vertical torquer is coupled between the gun and the vehicle for positioning the gun for vertical alignment. A vertical rate gyro is coupled to the telescope for motion therewith. The gyro is coupled through an integrating amplifier to the deflection coil surrounding the image intensifier tube. The gyro and amplifier produce a signal indicative of vertical deflection from a predetermined reference. It is also coupled to a summing amplifier. The telescope vertical resolver is likewise coupled to the vertical summing amplifier. The output of the vertical summing amplifier is a signal indicative of the algebraic sum of the gyro signal and the resolver signal. It is coupled to a differential amplifier which derives another signal from the gun vertical resolver. The differential amplifier provides a signal indicative of the algebraic difference between its two input signals to provide an output alignment signal for positioning the gun. Another output of the vertical differential amplifier is coupled to a threshold amplifier which in turn is coupled to a relay. A normally closed contact of the relay is in series with a trigger switch for controlling the firing of the gun.

Thus, a telescope 100 is oriented along an optical axis 101. The telescope includes an objective lens 102 which focuses on the input face 103 of an image intensifier tube 104. A magnetic deflection coil 105 surrounds the tube. The output face 106 of the tube is adjacent a reticle 107 having an orthogonal set of cross-hairs intersecting at a viewing axis 108a. An eyepiece 108 is coupled to a frame member 109 and comes to a focus at the reticle 107. The member 109 is rotatably coupled to a telescope vertical resolver 110 which is mounted on the frame 111 of a vehicle. The resolver 110 is coupled to a vertical summing amplifier 112. A vertical rate gyro 113 is coupled to the telescope for motion therewith. The gyro output is coupled to an integrating amplifier 114 which is in turn coupled to the magnetic deflection coil 105 and to the summing amplifier 112. A source of elevation signal 115 is also coupled to the amplifier 112.

The output of the summing amplifier 112 is coupled to a vertical differential amplifier 116. A gun 117 is rotatably coupled to a gun vertical resolver 118 which is mounted on the frame 111. The resolver 118 is electrically coupled to the differential amplifier 116. An output of the amplifier 116 is coupled through a vertical torquer amplifier 119 to a vertical torquer 120. Another output of the differential amplifier 116 is coupled to a trigger control amplifier 121. The amplifier 121 operates only above a selected threshold voltage. It is coupled to a relay 122 which controls a normally closed contact 122(a) in series with a trigger switch 123. The trigger switch and relay contact are connected in series with a firing circuit controlling the firing of the gun 117.

*Operation*

The observer trains the telescope on a desired target along the optical axis. When the target is centered with respect to the reticle, the viewing axis coincides with the optical axis. A signal from the resolver 110 is coupled to the vertical summing amplifier and is added to a desired elevation level provided by the elevation signal control 115. The output of the summing amplifier is applied to the vertical differential amplifier 116. The gun vertical resolver 118 provides a signal indicative of its vertical position with respect to the vehicle frame 111. If the boresight axis 124 of the gun 117 is not aligned with the optical axis 101, the differential amplifier 116 produces an output signal which is amplified and applied to the torquer 120 to align the boresight axis 124. At this time the reference frame as defined by the vertical rate gyro coincides with the optical axis. In the event of a vertical deflection provided, for example by the pitching of the vehicle, the gyro produces a signal in accordance with the rate of deflection. The output of the integrating amplifier 114 is a measure of the vertical deflection angle of the optical axis from the reference frame. This signal is applied to the magnetic deflection coil 105 which restores the target image to the center of the reticle.

Another output of the amplifier 114 is coupled to the summing amplifier 112 and then to the differential amplifier 116 to produce an alignment signal coupled through the vertical torquer amplifier 119 to the vertical torquer 120. The boresight axis 124 is then realigned to correspond with the inertial frame. Since the gun 117 has substantial mass, its motion lags that of the target image somewhat.

A front view of the reticle 107 and output face 106 of the tube 104 is shown in FIG. 3A. A target image 125 is shown at the center of the intersecting cross-hairs. The dotted line image 126 shown vertically displaced from the center of the cross-hairs indicates the true signal position. The image 125 tends to move in the direction of the image 126 as the error signal from the gyro decays. The observer corrects for that motion by realigning the telescope with the new reference frame provided by the gyro.

If the spurious motion is such as to deflect the telescope at a very high speed and restore it immediately to its initial condition, the target image tends to remain at the center of the cross-hairs at all times. The gun tends to follow the deflection signal and remain aligned with the inertial reference. If the vehicle is subject to continuing vibrations, the output of the resolver 118 as applied to the differential amplifier 116 differs from that at the output of the vertical summing amplifier 112. If this difference signal becomes excessive it exceeds the threshold of the amplifier 121 and energizes the relay 122 to open the normally closed contact 122(a) and disable the firing circuit. When the trigger switch 123 is depressed the firing interval is reduced to that portion of the cycle in the vicinity of the conjunction of the gyro error signal and the boresight signal. This is graphically represented in FIG. 4.

To introduce horizontal alignment control, a horizontal rate gyro is added, orthogonally oriented relative to the vertical rate gyro 113. It is coupled through a horizontal integrating amplifier to a horizontal deflection coil surrounding the tube 104. The member 109 of the telescope is coupled to a horizontally gimbaled resolver which is in turn coupled to a horizontal summing amplifier deriving inputs from the horizontal integrating amplifier and an azimuth signal source. A gun horizontal resolver is added to the gun as well as a horizontal torquer. The horizontal resolver and summing amplifier are coupled to a horizontal differential amplifier. The horizontal alignment signal is coupled to the horizontal torquer and to another control relay having another normally closed contact in series with the firing circuit.

The invention has application to the problem of controlling the firing of a gun in one vehicle from a sighting telescope in another vehicle. This requires of course, that the orientation between the two vehicles be known. While the above discussion has been directed to alignment control of a gun to maintain it on target, it will be apparent that the invention has broad application to alignment control problems.

While there has hereinbefore been presented what is at present considered to be the preferred embodiment of the invention, it will be apparent to those of ordinary skill in the art that many changes and modifications may be made thereto without departing from the true spirit and scope

What is claimed is:

1. Alignment control apparatus comprising:
   means for receiving imageable intelligence from a target;
   means for producing an error signal indicative of misalignment between the instantaneous position of the receiving means and a desired reference position of the receiving means;
   means for producing error signals indicative of the position of the receiving means relative to the target;
   means coupled to both of said error signal producing means and said receiving means for correcting the position of said imageable intelligence in response to said error signals thereby stabilizing the presentation of said imageable intelligence;
   means coupled to said error signal producing means and coupleable to an operating mechanism for influencing the position of the operating mechanism in response to said error signal.

2. The alignment control apparatus of claim 1, wherein:
   said received signal is an optical image;
   said receiving means includes an image converter tube wherein said image is converted into a deflectable electron stream and reconverted to an optical image for viewing; and
   said deflection means includes a magnetic coil surrounding said tube.

3. The apparatus of claim 1 wherein said received imageable intelligence is optical and said receiving means includes an image converter wherein said imageable intelligence is converted to electrical signals.

4. The apparatus of claim 1 further comprising means for enabling the operating mechanism when the relative position of the mechanism and the target is within predetermined limits.

5. The apparatus of claim 4 wherein the operating mechanism is a weapon.

6. The apparatus of claim 5 wherein:
   the imageable intelligence is optical;
   said receiving means includes an image converter tube which converts the received intelligence to electrical signals and reconverts said signals to optical image intelligence; and
   said deflecting means includes an electromagnetic deflection system encompassing said tube.

7. The apparatus of claim 1 further comprising:
   means coupled to said receiving means for generating first signals indicative of the position of the receiving means;
   means coupled to the operating mechanism for generating second signals indicative of the position of the mechanism;
   means coupled to said first and second generating means and said error signal producing means for combining said signals and transmitting said combined signal to said influencing means whereby the position of the operating mechanism is influenced as a result of the relative positions of the target, receiving means and the operating mechanism.
   an image converter tube ssytem disposed within said 8. The alignment control apparatus of claim 7, wherein:
   said receiving means includes a telescope having an objective lens and an eyepiece, gimbal mounting means disposed to enable two degrees of angular motion of said telescope; and
   an image converter tube system disposed within said telescope along said optical axis between said objective lens and said eyepiece with an input surface at the focal plane of said objective lens and an output surface at the focal plane of said eyepiece whereby the image appearing at the output surface is available for viewing by an observer and said image is free from spurious motions relative to said inertial reference.

9. The apparatus of claim 7 wherein said imageable intelligence is optical; and
   said receiving means includes an image converter which converts the received optical intelligence to electrical signals.

10. The apparatus of claim 9 wherein said deflecting means includes a magnetic coil surrounding said image converter.

11. The apparatus of claim 7 further comprising means for enabling the operating mechanism only when the relative position of the mechanism and said target is within predetermined limits.

12. The apparatus of claim 11 wherein the operating mechanism is a weapon.

13. The apparatus of claim 12 wherein the weapon is a gun gimbaled for freedom of movement about a pair of orthogonal axes.

14. The apparatus of claim 13 wherein said received intelligence is optical and said receiving means includes an image converter tube which converts the received optical intelligence to electrical signals and reconverts said electrical signals to optical images; and
   wherein said deflecting means includes an electromagnetic deflector system encompassing said tube.

References Cited

UNITED STATES PATENTS

| | | | |
|---|---|---|---|
| 2,612,692 | 10/1952 | Weiss | 89—41.6 |
| 2,700,106 | 1/1955 | Taylor | 89—41.6 |
| 2,709,303 | 5/1955 | Hammond | 89—41.6 |
| 2,836,894 | 6/1958 | Wagner | 89—41.6 |

BENJAMIN A. BORCHELT, *Primary Examiner.*

T. H. WEBB, *Assistant Examiner.*